Nov. 29, 1938.   L. NAN   2,138,242
PEDAL ATTACHMENT FOR GEAR SHIFT LEVERS
Filed June 28, 1937
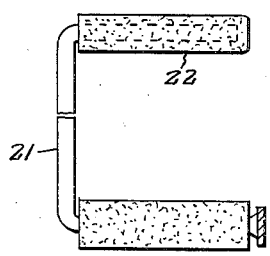
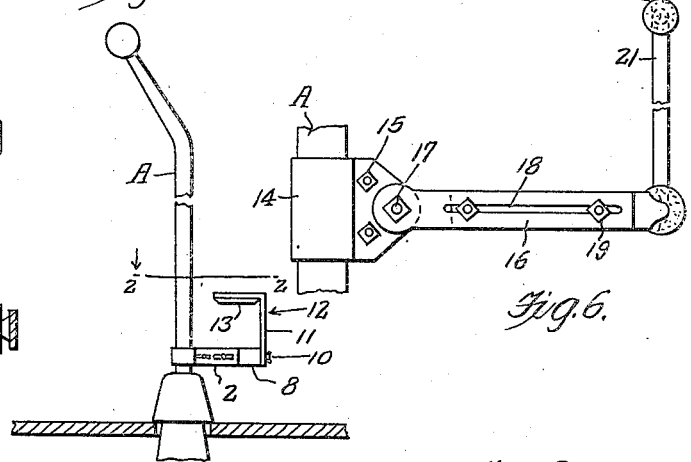
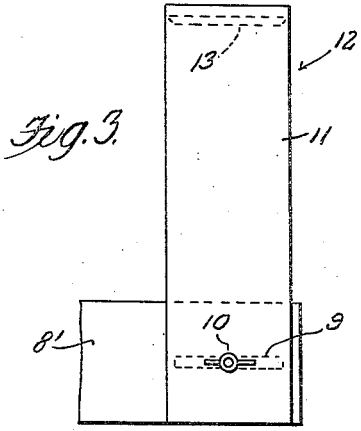
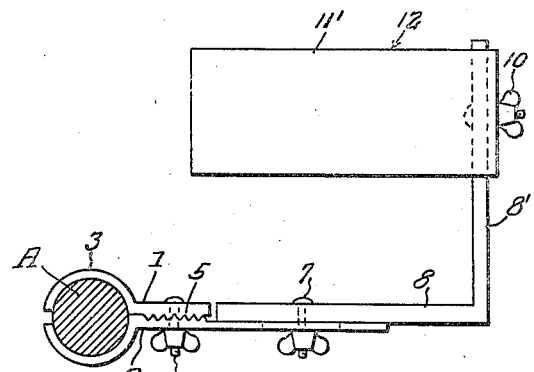
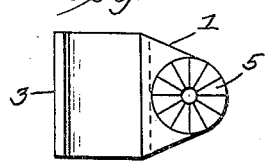
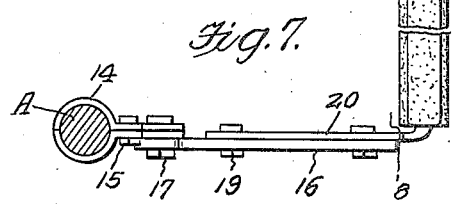
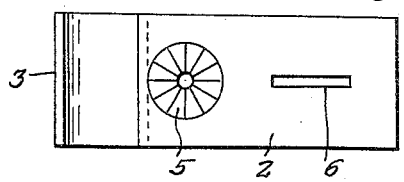
Inventor
Lee Nan,
By Clarence A. O'Brien
Hyman Berman
Attorneys Patented Nov. 29, 1938

2,138,242

UNITED STATES PATENT OFFICE 2,138,242

PEDAL ATTACHMENT FOR GEAR SHIFT LEVERS

Lee Nan, Tucson, Ariz.

Application June 28, 1937, Serial No. 150,838

2 Claims. (Cl. 74—544)

This invention relates to a pedal attachment for the shift lever of a motor vehicle, the general object of the invention being to provide means whereby the lever can be shifted by one of the feet of the operator of the vehicle.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is an elevation, partly in section, showing the invention applied to a gear shift lever of an automobile.

Figure 2 is a section on line 2—2 of Figure 1.

Figure 3 is a fragmentary front view of the attachment.

Figure 4 is a view looking at the inner face of the short jaw of the device.

Figure 5 is a similar view of the long jaw of the device.

Figure 6 is an elevation showing a modified form of the device attached to the shift lever.

Figure 7 is a plan view with the lever in section, of the modification.

Figure 8 is a section on line 8—8 of Figure 7.

Referring to Figures 1 to 5, both inclusive, it will be seen that the first form of the invention includes the jaw members 1 and 2, each formed with a substantially semi-circular jaw 3 for gripping a part of the gear shift lever A of an automobile. A bolt equipped with a winged nut, shown generally at 4, connects the two jaw members together and each jaw member is formed with a circular toothed part 5, the two parts engaging each other around the bolt when the nut is tightened, so as to prevent relative movement between the parts. The jaw member 2 is formed with a thin extension, which is provided with a longitudinally extending slot 6 for receiving a bolt 7, which is carried by one arm of an angle member 8, so that the jaw member 2 can be adjusted longitudinally on the member 8. The other arm of the angle member, shown at 8', forms a foot-engaging part and at its free end this part is provided with a longitudinally extending slot 9, shown in dotted lines in Figure 3, for receiving a bolt 10 which passes through a hole in the lower end of the vertical arm 11 of an angle member 12, the other arm 11' of which extends horizontally and rearwardly toward the front seat of the vehicle. A pad 13 of rubber or the like is fastened to the under face of this arm 11'.

Thus it will be seen that the device can be readily attached to the shift lever A and the parts can be adjusted so that the portions 8' and 11' can be readily engaged by the foot of an operator of the vehicle. It will be understood that the sole of the shoe on a foot of the operator will bear against the rear face of the member 8' and the toe will engage the pad 13 on the under face of the part 11'. Then by shifting the foot, the lever 8' can be manipulated to the desired positions.

In the modification shown in Figures 6, 7 and 8, the two jaw members 14 are similar to each other and are connected together by the bolts 15, which, when the nuts thereof are tightened, cause the jaws of the members to grip the lever. The two jaw members are pivoted to the rear end of a bar 16 by a bolt 17 so that the jaw members as a unit can be tilted or partly rotated about the bolt 17, and then by tightening the nut of said bolt, the parts will be held in adjusted position.

The member 16 is formed with a longitudinally extending slot 18 through which pass the bolts 19 carried by a bar 20 so that the members 16 and 20 are adjustably connected together and a U-shaped member 21 is carried by the bar 20. This member 21 has its limbs horizontally arranged, with one limb above the other, and the lower limb is connected with the bar 20 and extends at right angles thereto. These limbs are covered with rubber or the like, as shown at 22.

In this form of the invention, the toe portion of the foot is placed on the lower limb of the member 21 and against the front portion of the upper limb, so that, it might be said, the foot is hooked into the member 21, thus enabling the device, with the lever A, to be readily shifted from one position to the other by the movement of the foot.

It will be understood that the parts can be adjusted to suit different sizes of levers and levers of different cars, as well as the feet of different types of drivers.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A pedal attachment for the gear shift lever of a motor vehicle comprising a pair of clamping jaws for engaging a part of the lever, an angular bar having one arm thereof adjustably connected with one jaw, and its other arm extending at right angles from the front end of the first mentioned arm for engagement by a portion of the foot of an operator, an upper member for engagement by another portion of the foot of the operator, and means for connecting together the foot-engaging parts.

2. A pedal attachment for the gear shift lever of a motor vehicle comprising a pair of clamping jaws for engaging a part of the lever, an angular bar having one arm thereof adjustably connected with one jaw and its other arm extending at right angles from the front end of the first mentioned arm for engagement by a portion of the foot of an operator, an upper member for engagement by another portion of the foot of the operator, means for adjusting the parts to suit different types of drivers and means for securing said clamping jaws on different types of levers.

LEE NAN.